US007065659B2

(12) United States Patent
Malueg et al.

(10) Patent No.: US 7,065,659 B2
(45) Date of Patent: Jun. 20, 2006

(54) POWER MANAGEMENT ARCHITECTURE FOR DEFINING COMPONENT POWER STATES UNDER A GLOBAL POWER STATE AND MAINTAINING A POWER STATE FLOOR FOR A SPECIFIED COMPONENT IF A POWER STATE FOR THE SPECIFIED COMPONENT UNDER A NEW GLOBAL POWER STATE IS BELOW THE POWER STATE FLOOR

(75) Inventors: Michael D. Malueg, Renton, WA (US); Jeffrey D. Midkiff, Renton, WA (US); Jeff D. Rosenfeld, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 485 days.

(21) Appl. No.: 10/184,595

(22) Filed: Jun. 28, 2002

(65) Prior Publication Data

US 2004/0003300 A1    Jan. 1, 2004

(51) Int. Cl.
G06F 1/26 (2006.01)
G06F 1/32 (2006.01)
(52) U.S. Cl. ...................................... 713/300; 713/320
(58) Field of Classification Search ................ 713/300, 713/320
See application file for complete search history.

(56) References Cited

U.S. PATENT DOCUMENTS

| 5,230,074 | A |   | 7/1993  | Canova, Jr. et al. |         |
|-----------|---|---|---------|--------------------|---------|
| 5,423,045 | A |   | 6/1995  | Kannan et al.      |         |
| 5,511,205 | A |   | 4/1996  | Kannan et al.      |         |
| 5,630,142 | A |   | 5/1997  | Crump et al.       |         |
| 5,784,628 | A |   | 7/1998  | Reneris            |         |
| 5,794,058 | A |   | 8/1998  | Resnick            |         |
| 5,822,597 | A |   | 10/1998 | Kawano et al.      |         |
| 5,919,264 | A | * | 7/1999  | Reneris            | 713/324 |
| 6,122,745 | A | * | 9/2000  | Wong-Insley        | 713/300 |
| 6,131,166 | A | * | 10/2000 | Wong-Insley        | 713/300 |
| 6,289,399 | B1|   | 9/2001  | Furuichi et al.    |         |
| 6,324,651 | B1|   | 11/2001 | Kublik et al.      |         |
| 6,598,169 | B1| * | 7/2003  | Warwick et al.     | 713/320 |

OTHER PUBLICATIONS

Advanced Configuration and Power Interface Specification, Jul. 27, 2000, Revision 2.0, pp. 21-23,30-31,48-51,225-230,416.*

(Continued)

*Primary Examiner*—Chun Cao
*Assistant Examiner*—Mark Connolly
(74) *Attorney, Agent, or Firm*—Woodcock Washburn LLP

(57) ABSTRACT

A method and power management infrastructure are disclosed that facilitate implementing application power requirements-derived device power state schemes, on a computing device comprising a plurality of component devices managed by device drivers. The disclosed power management framework includes a set of global power state definitions specifying, for each global power state, default power states for the component devices. The infrastructure also includes a power manager. The power manager includes an application interface including a function for registering device-specific requirements associated with particular applications executing on the computing device. The power manager also includes a device power state set function facilitating issuing a device-specific command setting a power state of a specified component device. The power manager executes decision logic for detecting that the power state requirement for a device exceeds a current power state, and in response invokes the device power state set function to set the component device's power state to the required power state.

28 Claims, 8 Drawing Sheets

OTHER PUBLICATIONS

"Microsoft Windows CE 3.0 Feature Overview," 2000, retrieved at http://www2.abacus.co.uk/microsoft/cefeatures.htm (6 pgs.).

"Mobile Computing," Microsoft, 2001, retrieved at http://www.microsoft.com/windows2000/techinfo/reskit/en-us/prork/prdc_mcc_jbwh.asp?f Oct. 6, 2004 (4 pgs.).

* cited by examiner

US 7,065,659 B2

POWER MANAGEMENT ARCHITECTURE FOR DEFINING COMPONENT POWER STATES UNDER A GLOBAL POWER STATE AND MAINTAINING A POWER STATE FLOOR FOR A SPECIFIED COMPONENT IF A POWER STATE FOR THE SPECIFIED COMPONENT UNDER A NEW GLOBAL POWER STATE IS BELOW THE POWER STATE FLOOR

FIELD OF THE INVENTION

The present invention relates generally to computing devices. More particularly, the present invention relates to methods and computer management components that define and carry out power management in computing devices to ensure efficient utilization of a limited power supply such as battery power in a portable computer or embedded computing device (e.g., a Web-enabled cellular phone).

BACKGROUND OF THE INVENTION

There are numerous reasons to reduce, if not minimize, energy consumption in computing devices. One very common reason is to prolong battery life in a rechargeable battery pack. Such battery packs are found within notebook/ laptop computers, handheld computers, personal digital assistants, cell phones, etc. The re-chargeable battery packs often comprise a large portion of the weight of portable computing devices such as notebook and hand held computing devices, increasing the efficiency of such computing devices enables smaller battery packs to be utilized without compromising on re-charge life of the computing devices. Another benefit of reduced energy consumption includes reducing the heat created by the computing devices. The reduced heat consumption can eliminate/reduce the need to use a cooling device that in turn reduces the battery life. Finally, there is a general interest in not wasting energy. The last two interests apply to all computing devices regardless of whether they are battery powered or powered from a wall outlet.

In response to the need for efficient use of power, power management capabilities are provided with a wide variety of computing devices. One such example, Advanced Control Power Interface (ACPI) incorporates a power management driver that controls implementation of a set of stepped power states. A power state is associated with a level of power consumption by either a system or a particular component device within a system. Beginning at a highest level, each successive power state consumes a lower amount of power. Thus, the first level consumes maximum energy and the final level consumes the least amount.

The ACPI power management driver supports a set of six global power states and four device power states assignable by device drivers to their component devices (e.g., a display, a disk drive, a CPU, etc.) at each of the six global power states. The six global power states are assigned at the time a computing device is manufactured. By way of example, a manufacturer determines the way in which component devices will operate at each of the six levels. This is accomplished by specifying one of the potentially four levels of operation for each device at each of the six levels. Based upon energy consumption data provided/determined for each device at each of its specified power states, the manufacturer determines the total power consumption for each of the specified levels. The six power states are arranged from highest to lowest power consumption level. One way in which such a restriction is implemented is to require that device power state either stay the same or decrease from higher global power state to a lower power state.

Another aspect of the prior known power management schemes is that they are statically defined and inflexibly implemented. Once assigned, the six global power states are not re-assignable without reinitializing the entire computing device. The only control over designating power states of devices is through specifying one of the six available global power states. Thus, if a particular, power hungry component device requires a higher level power state, then all the remaining component device power states are raised or maintained in accordance with the lowest global power state that meets the needs of the power hungry component device. This leads to inefficient and unnecessary consumption of power in the computing device.

SUMMARY OF THE INVENTION

In view of the shortcomings of the prior known methods for carrying out power management schemes, in particular the limited ability to designate power consumption states in a meaningful way, a method and system are disclosed that carry out flexible, non-linear management of component device power usage in a computing device. In particular, a power management framework facilitates applying application-specific power state schemes based upon the specific needs of an application executing upon the computing device comprising a plurality of component devices managed by device drivers.

The power management framework includes a set of global power state definitions. Each global power state definition specifies a default maximum power state for each of the plurality of component devices managed by device drivers. A power manager operates as the arbiter of potentially conflicting/differing power requirements/requests among both applications and device drivers operating on the computing device. The power manager includes an application interface that facilitates registering a required power state for a specified one of the plurality of component devices managed by the device drivers. The power manager furthermore includes a device driver interface including a device power state set function that facilitates issuing a device-specific command setting a power state of the specified component device to a specified power state. The power manager also includes decision logic that detects that the power state requirement exceeds a current power state of the specified one of the plurality of component devices, and in response invokes the device power state set function to set the power state of the specified component device to the required power state.

The present invention also comprises a method for implementing application power requirements-derived device power state schemes, on a computing device comprising a plurality of component devices managed by device drivers and a set of global power state definitions, wherein each global power state definition specifies a default power state for each of the plurality of component devices managed by device drivers, and a device driver interface including a device power state set function facilitating issuing a device-specific command setting a power state of the specified component device to a specified power state.

The method comprises establishing a set of device-specific power states under a selected one of the set of global power state definitions. The method further includes registering a required power state for a specified one of the plurality of component devices managed by the device drivers. Next, the computing system detects that the power state requirement exceeds a current power state of the specified one of the plurality of component devices, and in response invokes the device power state set function to set the power state of the specified component device to the required power state.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE DRAWINGS

Figure 1:
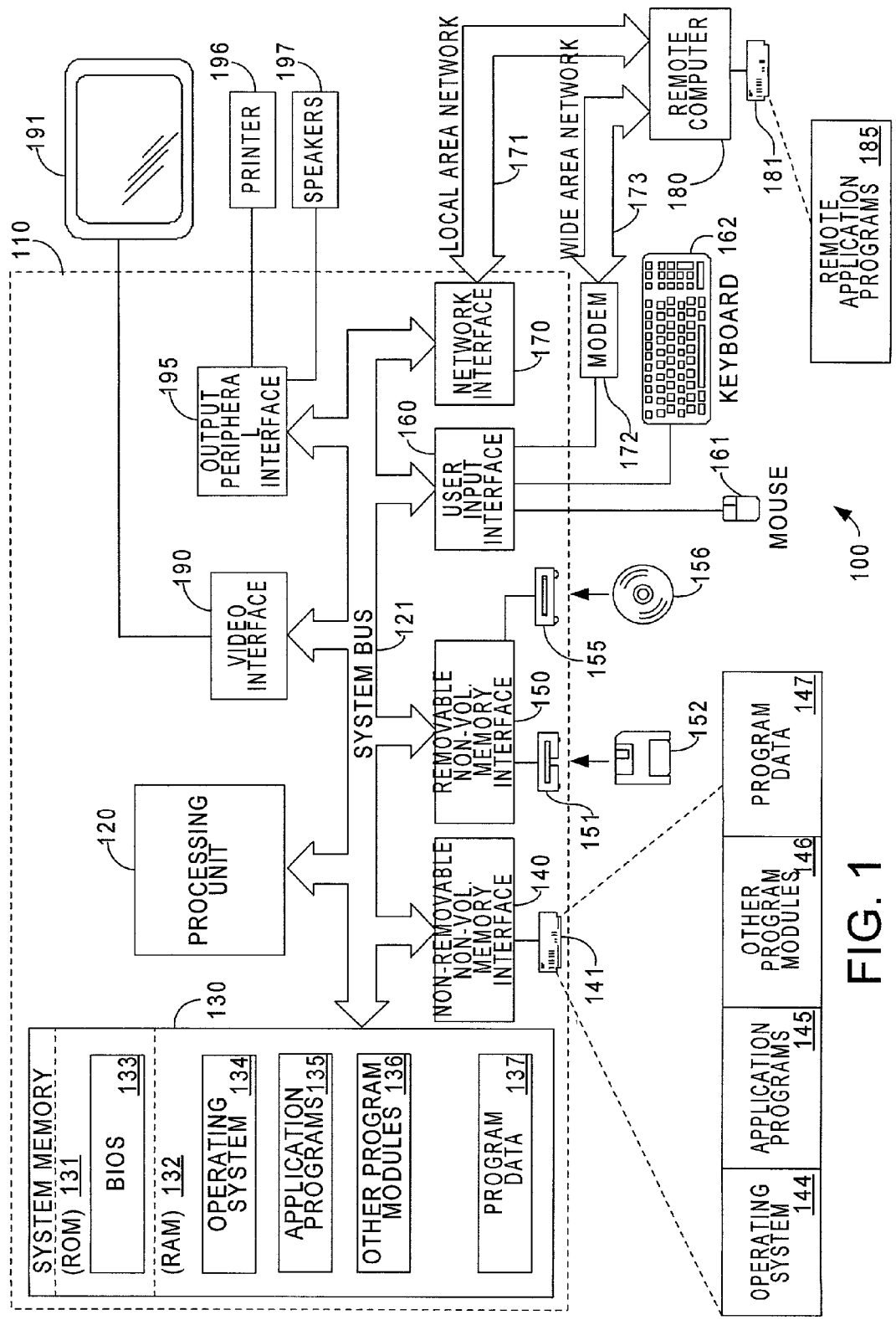
FIG. 1 is a block diagram depicting an exemplary computer system for carrying out an embodiment of the invention.

The present invention is embodied within a power manager executing within a computing device comprising a plurality of component devices (e.g., CPU, output ports, sound cards, displays, disk drives, modems, etc.), and wherein ones of the component devices are capable of being individually assigned one of a set of device power states supported by the individual devices. The exemplary power manager includes a set of six global power states. Each global power definition specifies a default power state for each component device from a set of up to five different device power states. Other embodiments of the invention support a differing number of global power states and device power states. As will be explained further herein below, the power manager provides a set of interfaces enabling resetting individual device power states without specifying a new global power state that potentially effects the power state designations for all component devices.

With regard to the above-mentioned power manager interfaces, in accordance with an embodiment of the present invention, a driver interface to the power manager facilitates initiating a power state change to an individual component device without modifying the global power state. By way of example, the power manager includes a driver interface that includes a function enabling a component device driver to request permission to enter a power state below a device power state specified under a current global power state definition.

The lower power level persists until the power manager receives a power state event notification (either a device or global state change) that specifies a power state differing from the previously set device power state. Thus, if the power manager grants permission to a component device driver to place a component device in the requested lower power state (by issuing a set device state command to the driver), the lower power state may be over-ridden by a subsequent power management event processed by the power manager to enter a different device power state.

Furthermore, an application interface to the power manager enables applications executing upon the computing device to request maintaining device power states for individual ones of the component devices at a level differing from default power states assigned to the component devices based upon a current global power state. In a particular embodiment of the invention, the application interface enables an application executing on the computing device to specify a minimum required power state for a particular component device that persists even when the global power state changes. Thus, an application, such as an e-book reader can specify a fully powered display device even when the global power state of the computing device exists at, or transitions to, a lower global power state that specifies a default display device power state that shuts the display off. As a result of the application interface supported by the power manager, customized, application-specific power states are attained without requiring applications to have global knowledge of component device power requirements.

FIG. 1 illustratively depicts an example of a suitable operating environment 100 for carrying out the power management scheme in accordance with the present invention. The operating environment 100 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, laptop/portable computing devices, hand-held computing devices, multiprocessor systems, microprocessor-based systems, network PCs, minicomputers, mainframe computers, distributed computing environments that include any of the above systems or devices, and the like. The disclosed power management framework enables a number of diverse interests to be served including prolonging battery life, controlling heat creation, or merely avoiding wasting energy.

The invention is described in the general context of a set of steps and processes carried out by computer-executable instructions, such as program modules, being executed by a computer. Generally, program modules include routines, programs, objects, components, data structures, etc. that perform particular tasks or implement particular abstract data types. Though the exemplary embodiment is described with reference to locally executed processes on a single computer system, the invention is potentially incorporated within network nodes operating in distributed computing environments where tasks are performed by remote processing devices that are linked through a communications network. In a distributed computing environment, program modules are generally located in both local and remote computer storage media including memory storage devices.

With continued reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is sometimes stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through a output peripheral interface 190.

The computer 110 potentially operates in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
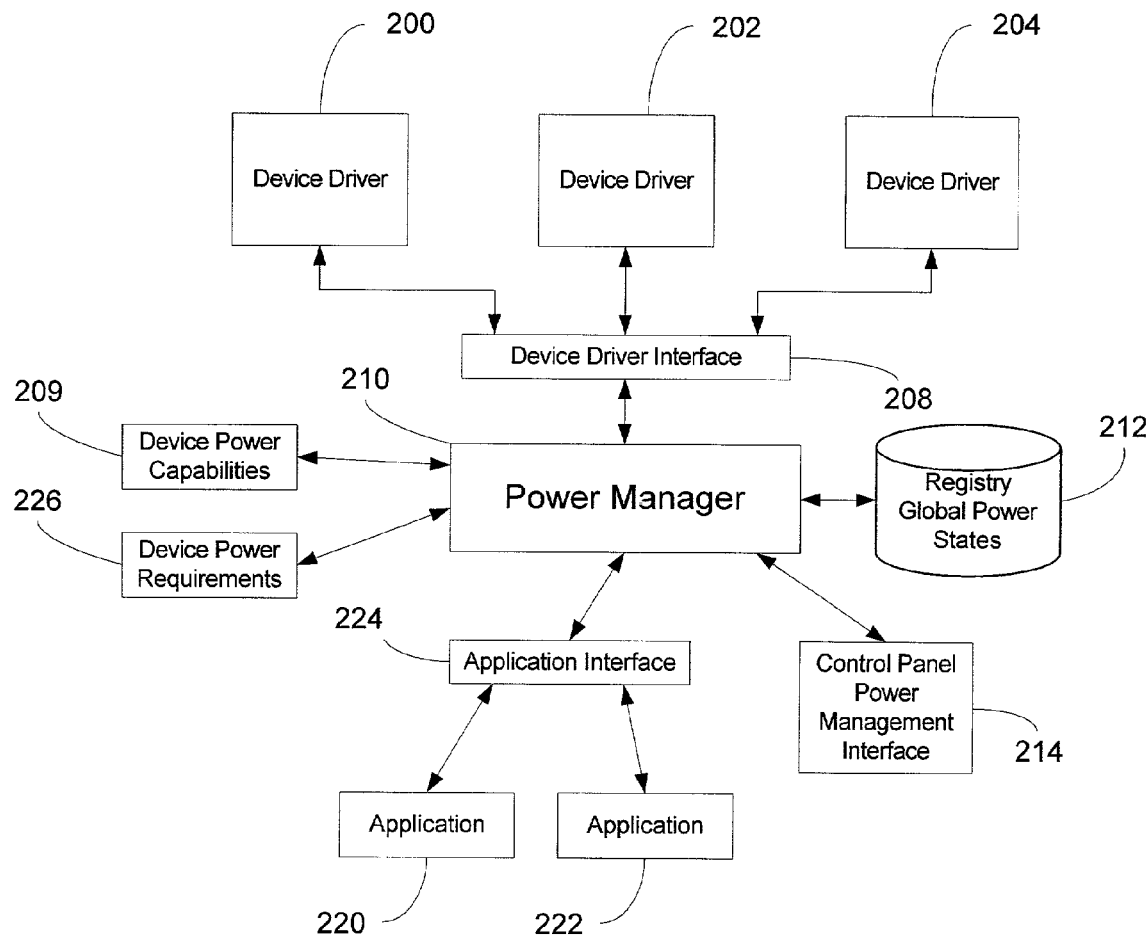
FIG. 2 is a high level schematic diagram depicting the primary components of a system for carrying out power management in a computing system embodying the present invention.

FIG. 2 is a high level schematic diagram identifying participating components of a computing device incorporating an exemplary power management scheme embodying the present invention. The exemplary computing device includes a set of component devices and their associated device drivers 200, 202, and 204. Each of the device drivers 200, 202, and 204 include a set of device power states. In an embodiment of the invention the device drivers support up five component device power states/levels: D0 is fully powered, D1 is fully functional at a lower power and/or performance, D2 is partially powered with automatic wakeup on request in less than 500 milliseconds, D3 is partially powered with device-initiated wakeup if available, and D4 is non-powered. Level D1 is used when a device is being used but where peak performance is not needed. A device at level D2 is standing by and must reach D1 (accept a request) within a half second. A device at level D3 is asleep, but is capable of raising the global power state on its own and consumes equal or less power than at level D2. At level D4 a component device does not consume a significant amount of power. While some peripheral busses require static terminations that use non-zero power when a device is connected to the bus, such devices can be considered to support state D4 under the relaxed power state requirement.

A special component device, known in the exemplary embodiment as CPU0, exists solely for the power manager's benefit to represent the activity state of the CPU. When CPU0 is in state D3, it is in a halted state, and will recommence running code when it receives an unblocked interrupt. When CPU0 is in state D4, the system can only be brought back to a higher power state by rebooting the system.

A component device need not support all the above-mentioned device power states. The only necessary power state is D0 (fully powered). Thus, if one of the drivers 200, 202, or 204 is requested to enter a power state that is not supported by the component device, then it enters a next supported power state according to the following progression: D3>D4>D2>D1>D0. Thus, a device that cannot wake up a system (D3) will instead enter a non-powered state (D4) when signaled to enter the partially powered device-initiated wakeup state (D3).

In an embodiment of the invention, the drivers 200, 202 and 204 exhibit certain behaviors. For example, when one of the drivers 200, 202, or 204 is loaded, it places the device in a fully powered mode corresponding to level D0. When the driver is unloaded, it places the device in an inactive state (if available) corresponding to level D4.

An interface 208 facilitates communications between the drivers 200, 202, and 204 and a power manager 210. Initially, the device drivers 200, 202 and 204 inform the power manager 210 of associated devices' power management capabilities. The devices' power capability information is stored in a set of device power management capabilities 209 maintained by the power manager 210. Furthermore, in an embodiment of the invention the power manager 210 maintains a record, for each managed device, of the most recent requested state issued by the power manager 210. In that particular embodiment a managed device only transitions to a new power state in response to a request from the power manager 210. In an alternative embodiment, the power manager 210 queries/maintains a record of each device's power state.

The device drivers 200, 202 and 204 issue requests and receive requests and event notifications from the power manager 210 relating to placing the component devices at desired device power states. The communications between the device drivers 200, 202 and 204 and the power manager 210 are discussed in detail herein below with reference to FIGS. 3, 4, 5 and 6. It is noted that the interface 208 includes device-specific functions as well as functions supported by the power manager primarily for the benefit of applications (e.g., applications 220 and 222).

The power manager 210, in an embodiment of the invention, executes as a thread within an executable that is also responsible for managing global power states and setting individual device levels based upon the global power state. The global power state definitions (specifying particular device power states at each global power state) are generally designated by original equipment managers (OEMs) at the time the computing devices are made based upon the particular hardware component. The global power state definitions are stored within a registry 212. To assist in identifying the global power states in the registry 212, each state is given a descriptive name such as RunAC, Run_Battery, suspend, off, etc. Each state entry in the registry also potentially includes a default power state and specifically identified component device power states. The power manager takes an appropriate global power state from the registry 212 and maps the global power state to individual device component definitions.

In an embodiment of the invention, the set of global power state definitions can be re-defined and/or augmented with new global power state definitions that do not follow the step-wise power consumption levels associated with the OEM-defined global power states. One method to edit the set of global power state definitions is supported by a control panel power management interface applet 214 that lists a set of component devices and their power state assignments (D0–D4) at each global power state. The applet 214 also provides a global power state editor enabling users to modify existing global power state definitions and add new global power states (including device specific power state definitions) that are subsequently invoked, by way of example, by applications executing upon the computing device.

The power manager 210 arbitrates all requests to change state received from drivers 200, 202, and 204 and applications 220 and 222 executing upon the computing device. A driver will not be allowed to transition a component device to a lower state if an application has requested a higher states. In a preferred embodiment of the invention, the applications 220 and 222 submit requests to alter an individual component device's power state through the power manager 210. Though less desirable, in alternative embodiments power state requirements are submitted from an application directly to a device.

In operation, the power manager 210 is aware of the most recently requested (and—in other potential embodiments—the current) power state of each manageable component device on the computing device. Furthermore, the power manager 210 is aware of the global power state currently in effect. A default global power state in the event that no global power states are specified in the registry 212 is a fully powered state wherein all component devices operate at fully powered (level D0).

In accordance with an embodiment of the invention, one or more of the applications 220 and 222 submit requests and receive event notifications via an interface 224. In accordance with an embodiment of the invention, the applications issue requests to the power manager 210, via the interface 224, to maintain at least a minimum device power state (a power state floor) for a particular device. Thereafter, the power state floor is enforced by the power manager 210, the arbitrator of all requests to enter a particular device power state, until the application releases the request by an explicit call to the power manager or the application ceases execution on the computing device. The power state floor request is registered within a device power state requirements structure 226 maintained by the power manager 210.

The power state requirements structure 226 takes on a variety of potential forms in accordance with various embodiments of the invention. However, in an embodiment of the invention the power manager 210 maintains all the power state requirements of the applications in a heap (for each device) ordered according to their required power states for specified devices. The root node of the heap is the highest power requirement by an application on an identified device—and thus a current one being upheld. When a requirement is released (either explicitly or implicitly—when a process owning the requirement terminates), its requirement node (identified by a process handle or other suitable process identifier) is deleted from the heap. When the highest power level requirement is released, a highest remaining requirement is placed at the root node of the heap.

The power manager 210 handles three types of events. Application events request either a global power state change or a requirement for a device power state floor for a particular component device. Device events are issued by the device drivers 200, 202, and 204 requesting the power manager 210's consent for the associated devices to enter a lower power state. Device drivers or the devices themselves monitor their usage, and when usage is significantly down, the drivers 200, 202 and 204 issue the requests to enter a lower power state. The power manager 210 thereafter determines whether one of the applications has requested a higher power state floor for the particular device. If no such requirement exists, then the power manager 210 grants the device driver request to enter a lower power state through a set command to the requesting device driver. An external event is generally associated with hardware events such as removal of a detachable component device or activation of an off button. Yet another external event is a switch to, or from, battery power.

The following is an example of the device-specific power state assignments facilitated by the present invention. Consider a current global power state equal to Run (i.e., all component devices are at full power—or the D0 power state). A pager application running on the computing device issues a request to the power manager requiring the COM3 device component to be at least at the D3 power state. Since the requested power state floor is less than the current power state of COM3 (currently at D0), the power manager registers the request, but it does not change the COM3 power state. Subsequently, the global power state changes to a "Suspend" global power state specifying a D4 power state for all component devices. However, in view of the registered D3 power state floor arising from the pager application's request, the COM3 device component is changed to the D3 power state rather than D4—thereby honoring the pager application's request. Furthermore, in the event that the COM3 device component issues a request to enter the D4 power state, the power manager 210 will deny the request in view of the D3 floor request submitted by the pager application.

Figure 3:
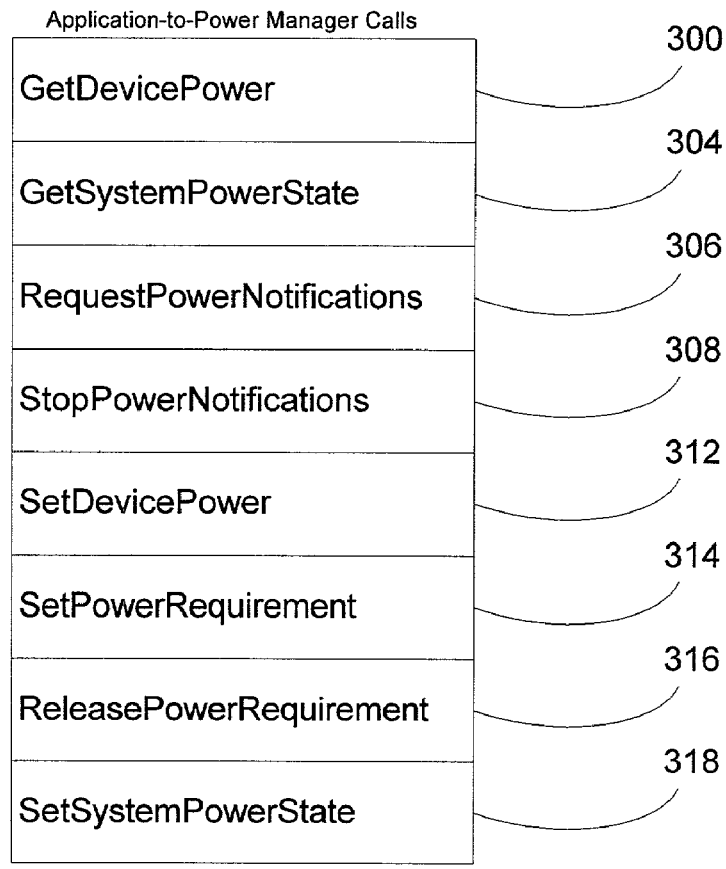
FIG. 3 is an exemplary list of application-to-power manager calls supported by a power manager.

Turning to FIG. 3, an exemplary list of functions that the power manager 210 exposes to applications in accordance with an exemplary embodiment of the present invention. Such calls are issued by the applications 220 and 222 to the power manager 210 to establish a desired global or component device-specific power state as well as to maintain an informed status with regard to the actual power states of the system or particular component devices within the system.

A GetDevicePower function 300 requests the power manager to determine and return the current power level (Dx) of an identified component device. A GetDevicePower function 300 call, by way of example, is in the following form:

DWORD GetDevicePower(PVOID pvDevice, DWORD dwDeviceFlags, PCEDEVICE_POWER_STATE pDeviceState).

The pvDevice parameter specifies the component device. The actual meaning is determined by the flags parameter. The dwDeviceFlags parameter specifies optional behaviors associated with the function providing the current power of an identified device. The flags specify whether the pvDevice parameter is a named device (e.g., COM1:, MQ200, etc.). The pDeviceState parameter specifies a location for the returned power state (Dx) of the identified device. The GetDevicePower function returns: ERROR_SUCCESS if successful, or an error code if unsuccessful.

A GetSystemPowerState function 304 requests the power manager to identify, by name, the global power state that is currently in effect. A GetSystemPowerState function 304 call, by way of example, is in the form of:

DWORD GetSystemPowerState(LPWSTR pBuffer, DWORD Length, PDWORD pFlags).

The pBuffer parameter specifies a pointer to a buffer to receive the current global power state name. The length parameter specifies the length of the buffer, and the pFlags parameter specifies a location for receiving the system power state flags which is the bitwise 'Or' of POWER_STATE_Xxx flags. The GetSystemPowerState function 304 returns ERROR_SUCCESS if successful. Otherwise if unsuccessful, then either ERROR_INSUFFICIENT_BUFFER, ERROR_NOT_FOUND or an operating system error are returned.

A RequestPowerNotifications function 306 provides a handle enabling applications to register to receive power notification events. The power notifications events are issued by the power manager 210 within a power_broadcast structure via message queues. A RequestPowerNotifications function 306 call, by way of example, is in the form of:

HANDLE RequestPowerNotifications(HANDLE hMsgQ, DWORD Flags).

The hMsgQ parameter specifies the application's message queue handle. The Flags parameter specifies which power notifications that the requesting applications seeks to receive. The RequestPowerNotifications function 306 receives a handle if the function is successful. Otherwise it returns NULL.

A StopPowerNotifications function 308 deregisters an application that previously registered with the power manager 210 to receive power events via a call to the RequestPowerNotifications function 306. A StopPowerNotifications function 308 call from the applications, by way of example, is in the form of:

BOOL StopPowerNotifications(HANDLE h).

The sole passed parameter is the handle previously returned by the power manager 210 in response to the application's RequestPowerNotifications function 306 call. The returned Boolean parameter indicates the success of the call to stop notifications.

A SetDevicePower function 312 requests the power manager 210 to issue a request to a device driver for a named device component to set the device component's power state to an indicated value. A SetDevicePower function 312 call from the applications, by way of example, is in the form of:

DWORD SetDevicePower(PVOID pvDevice, DWORD dwDeviceFlags, CEDEVICE_POWER_STATE DeviceState).

The pvDevice parameter specifies the component device in conjunction with the dwDeviceFlags parameter. By way of example, the dwDeviceFlags parameter specifies that the power request is for a named device (e.g., "COM1:", "MQ200", etc.). The DeviceState parameter specifies the device power state (Dx) that the requestor desires. The SetDevicePower function 312 returns: ERROR_SUCCESS—if the set command to the device driver is successful, or ERROR_SET_POWER_STATE_FAILED if there is an outstanding power requirement on the device that conflicts with the set request.

A SetPowerRequirement function 314 notifies the power manager 210 that the requesting application has a minimum device power state requirement for a particular identified component device. The SetPowerRequirement function 314 call ensures that a current device power state meets a submitted requirement and thereafter prevents the power manager 210 from placing the identified component device into a device power state that is lower than the specified required device power state (i.e., device power state floor) while the requirement is registered. Thus, once registered, the required power state specified by the SetPowerRequirement function 314 over-rides subsequent requests to place the device in a lower power state. Such requests for a device to enter a lower device power states arise from, for example: (1) a device power state specified for a new global power state, or (2) a device power state submitted in a request by a device driver to transition the device to a lower power state.

A SetPowerRequirement function 314 call, by way of example, is in the form of:

HANDLE SetPowerRequirement(PVOID pvDevice, CEDEVICE_POWER_STATE DeviceState, ULONG DeviceFlags).

The pvDevice parameter, in conjunction with the DeviceFlags parameter, specifies the device upon which the application seeks to place the power requirement. A DeviceState parameter specifies the minimum device power state (Dx) at which the device is to be maintained. If the device's current power state is higher than (or the same as) the specified required device power level, then the power manager 210 registers the requirement in the device power state requirements structure 226, but does not change the device's power state. If the device's current power state is below the required device level, then (in addition to registering the requirement) the power manager 210 issues a request to a device driver to raise the device's power state to the required device power state. The SetPowerRequirement function 314 returns: a handle if the request is successfully registered, or NULL in the case of an error.

It is noted that applications should explicitly release their power requirements as soon as they cease to be necessary using a ReleasePowerRequirement function 316. However, the power manager 210 will automatically release the requirement if the calling process exits for any reason before calling the ReleasePowerRequirement function 316. The power manager 210 maintains a single power requirement for each application and component device. Therefore, subsequent calls to the SetPowerRequirement function 314 on the same component device from the same application will overwrite a previous power state requirement with a new power state and return the same handle to the requesting application. The power manager 210 as the mediator of all requests potentially modifying a power state, takes into account all sources of a minimum power state requirement for a device before issuing a request to a device driver to change the device's power state.

The ReleasePowerRequirement function 316 enables an application to release a power requirement previously registered via the SetPowerRequirement function 314. A ReleasePowerRequirement function 316 call, by way of example, is in the form of:

DWORD ReleasePowerRequirement(HANDLE hPowerReq).

The hPowerReq parameter specifies a handle returned by a previous successful call by the application to the SetPowerRequirement function 314. The ReleasePowerRequirement function 316 returns: ERROR_SUCCESS if the release is successful, ERROR_NOT_FOUND if the handle was not found in the set of requirements maintained by the power manager 210, or an operating system error. With regard to setting a new power state when a highest requirement is released for a device, the power manager 210 determines the higher power state between (1) the default power state under a current global power state and (2) a highest remaining power state requirement requested by a process on the device. The power manager 210 then issues a request, if necessary, setting a new power state in the event that the higher of the two values identified above is lower than the state that was released.

The power manager 210, in an embodiment of the invention, also supports requests by applications to request entry into a particular global power state. A potentially useful instance for such a function exists where a custom global power state exists in the registry 212 for an application. Thus, multiple calls to set requirements or actual device power states can be replaced by a single call to a SetSystemPowerState function 318 from an application to the power manager 210 requesting entry of a named global power state. In response the SetSystemPowerState function 318 sets the system power state to the requested value. A SetSystemPowerState function call, by way of example, is in the form of:

DWORD SetSystemPowerState(LPCWSTR psState, DWORD StateFlags, DWORD Options)

The psState parameter names the desired global power state requested by the application. If the psState parameter is not NULL then the StateFlags parameter is ignored. If the psState parameter is NULL, then the StateFlags parameter names the global power state via the POWER_STATE_Xxx flags.

If power is suspended, the SetSystemPowerState function 318 returns a value only after the computing device's operation resumes and related PBT_RESUME messages (described herein below) have been broadcast. While the above-described functions are primarily intended for applications, the application to power manager function calls described with reference to FIG. 3 are also available to the device drivers 200, 202 and 204.

The power manager 210 uses message queues to issue power events to applications and device drivers that register for power event notification. Once registered to receive power notifications from the power manager 210, applications and drivers listen for power events of many types. Power notification events are issued in a POWER_BROAD-CAST structure including: a message (one of the PBT_x types described herein below), flags (one of the POWER_STATE_x types)—a DWORD integer that identifies one of the following values set forth in TABLE 1, length (of the global power state name), and SystemPowerState (the name of the global power state).

TABLE 1

| Flag | Description |
| --- | --- |
| POWER_STATE_ON | On state |
| POWER_STATE_OFF | Off state |
| POWER_STATE_CRITICAL | Critical state |
| POWER_STATE_BOOT | Boot state |
| POWER_STATE_IDLE | Idle state |
| POWER_STATE_SUSPEND | Suspend state |
| POWER_STATE_RESET | Reset state |

Though the term "broadcast" is used herein, the notifications are actually multicast to particular registered ones of the applications.

Figure 4:
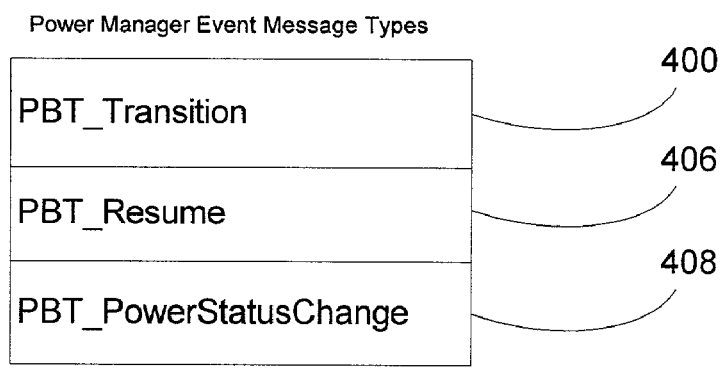
FIG. 4 is an exemplary list of event notifications issued by a power manager to applications and drivers that have requested power notifications.

Turning to FIG. 4 an exemplary list is provided of power event notification (broadcast) types issued by the power manager 210 to applications that have requested power notifications. A PBT_TRANSITION event 400 specifies a system power state transition. A PBT_QUERY event 402 constitutes a broadcast query request to enter the named state.

A PBT_RESUME event 406 notifies applications when returning from a suspended state back to a previous global power state. A PBT_POWERSTATUSCHANGE event 408 provides notification when the power supply switches to/from AC/DC power.

Figure 5:
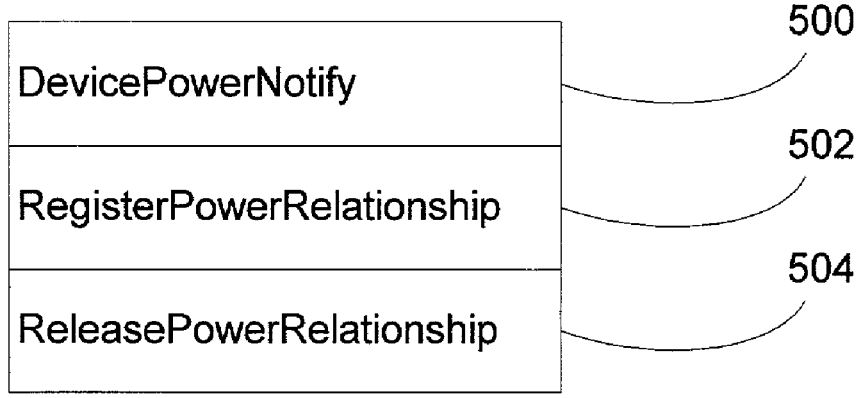
FIG. 5 is an exemplary list of device driver-to-power manager function calls supported by the power manager.

Turning to FIG. 5, an exemplary list of device driver-to-power manager function calls supported by the power manager interface are identified. A DevicePowerNotify function 500 enables device drivers to notify the power manager 210 of a lesser power need than the one associated with the component device's current power state. The following is an exemplary form for the DevicePowerNotify function 500:

DWORD DevicePowerNotify(PVOID pvDevice, CEDEVICE_POWER_STATE DeviceState, DWORD Flags).

The pvDevice parameter specifies the device with which the calling driver is associated. The DeviceState parameter indicates the desired device state (Dx) the device wishes to enter. In contrast to application power requirements discussed herein above that set a minimum requirement, the DevicePowerNotify function 500 is a request to enter a specifically identified device power state. The Flags parameter enables driver notification by name, handle, etc. (e.g., POWER_NAME, POWER_DDI, etc.). The DevicePowerNotify function 500 returns: ERROR_INVALID_PARAMETER—if the request itself is flawed; or ERROR_OPERATION_ABORTED—if the request could not be granted due to a pending power state requirement for the particular device. Otherwise, if successful, the power manager 210 propagates any operating system error code within a POWER_SET function 604 call (described herein below) issued to the requesting device driver to set the associated device to the requested device power state.

A RegisterPowerRelationship function 502 establishes dynamic parent/child or bus/client driver relationships. The RegisterPowerRelationship function 502 is used by drivers that manage power for a set of dependant child/client drivers. Examples of managing drivers include NDIS, USB, PCMCIA, etc. Parent drivers that manage their children handle power commands from the power manager 210 on the child's behalf. For example, NDIS intercepts all power commands issued by the power manager 210 and converts them into driver commands that its child mini-ports understand. A RegisterPowerRelationship function 502 call from the drivers, by way of example, is in the form of:

HANDLE RegisterPowerRelationship(PVOID pvParent, PVOID pvChild, PPOWER_CAPABILITIES pCaps, DWORD Flags).

The pvParent parameter (e.g., NDS0) specifies the name of the parent. The pvChild parameter specifies the child device's name (e.g., NE20001, NE20002, etc.). The pCaps parameter is an optional parameter specifying the identified child's power capabilities. The flags parameter specifies the form of the name parameters and any other desired call customization information. The RegisterPowerRelationship function 502 returns a handle if the function call was successfully completed. Otherwise the power manager 210 returns NULL. A parent driver registers each uniquely named child instance as needed. If the pCaps parameter is NULL, then the parent responds to a query from the power manager 210 to specify the child device's power capabilities.

The owner of the returned handle for a power relationship frees it with when the relationship is no longer required. This is accomplished by a ReleasePowerRelationship function 504. A ReleasePowerRelationship function 504 call from the drivers, by way of example, is in the form of:

DWORD ReleasePowerRelationship(HANDLE h).

The handle parameter is the handle provided when the child relationship was registered.

Figure 6:
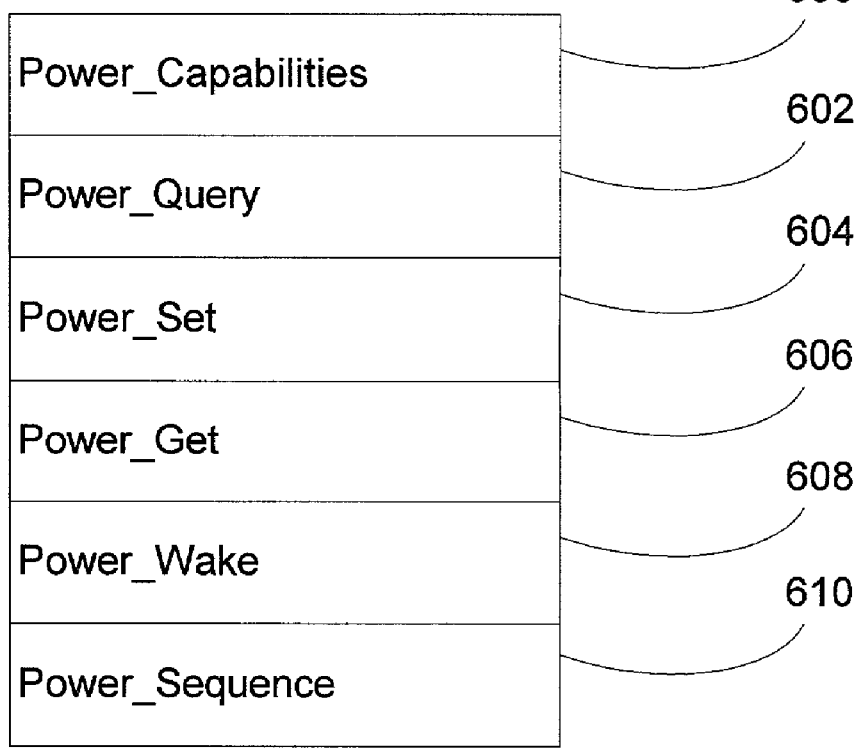
FIG. 6 is a set of power manager-to-device driver calls potentially supported by device drivers.

Turning now to FIG. 6 a set of power manager-to-device function calls potentially supported by device drivers are depicted. A Power_Capabilities function 600 is a query from the power manager 210 to a component device driver to determine device-specific capabilities. If the driver fails to answer this function call, then power manager 210 assumes the driver does not handle the other available function calls and will not issue them to the driver. In response to the Power_Capabilities function 600 call the driver fills a power capabilities structure of the type depicted in FIG. 7. If a device driver is unable to respond to the Power_Capabilities function 600 call, then the power state for the device is not administered by the power manager 210.

Figure 7:
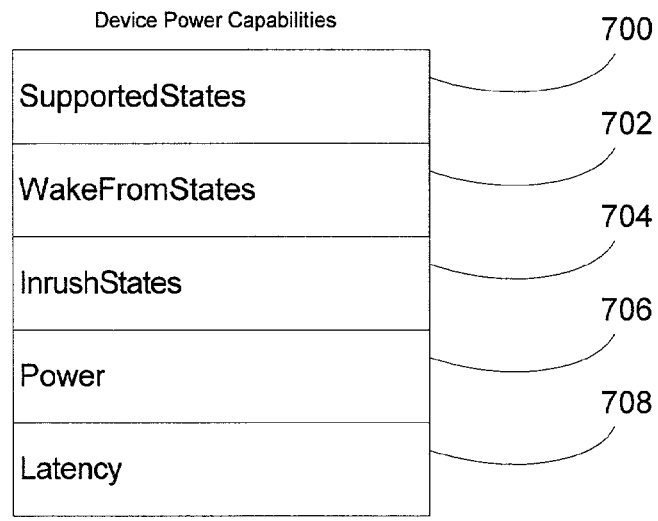
FIG. 7 is an exemplary set of fields in a device power management capabilities structure maintained by the power manager for registered devices.

Turning briefly to the device capabilities structure depicted, by way of example, in FIG. 7, a SupportedStates field 700 stores a bit mask indicating the power states (e.g., D0, D1, . . . D4) supported by the device hardware. Each potential state is represented by a single bit, and the bit is set if the device supports the state and clear if the device does not support the state.

A WakeFromStates field 702 stores a bit mask indicating the device power states from which the device hardware can awaken in response to an external signal that arrives while the device is in the specified state. Each potential state is represented by a single bit, and the bit is set if the device supports wake from the state and clear if the device does not support waking from the state.

An InrushStates field 704 stores a bit mask indicating the device power states wherein the device hardware has power inrush requirements. Each state is represented by a single bit, and the bit is set if the device has inrush requirements at the state and clear if the device does not. Drivers for devices that require an inrush of power at the specified state set the appropriate bit. By way of example, bus drivers generally need to set bits in the InrushStates field 704. The inrush requirement notifies the power manager 210 so that such devices are powered up one at a time, in sequence with other such devices to avoid excessive power draw when the devices are raised to a higher power state.

A Power field 706 comprises an array of values (one per potential device state) and indexed by values ranging from D0 to D4. Each element of the array contains the maximum (highest-power) usage in milliwatts that the device uses (i.e., the power drain on the computing device's power supply) for each potential power state of the device. If a device state is not supported, then a value indicating a non-specified power consumption level is provided.

A latency field 708 comprises an array of values (one per potential device state) describing the approximate time, in milliseconds, that the device requires to return to the full power (D0) state from each of the specified device power states. If a device state is not supported, then a value indicating a non-specified latency is provided.

Having described the capabilities structure filled by the Power_Capabilities function 600, attention is again directed to FIG. 6, and other exemplary function calls from the power manager 210 supported by the device drivers. A Power_Query function 602 is a call to a particular component device to determine whether changing a device's power state is feasible. This function is not required before requesting a transition to a new device power state.

A Power_Set function 604 call from the power manager 210 requests an identified device to change from one device power level to another. The driver should be able to recognize and ignore resets to a same device power state. Drivers respond to the Power_Set function 604 calls by setting the device power to the desired state. The devices return a value corresponding to the power level to which the device was actually set. A null value in the response from a device driver indicates that the power state was unchanged.

A Power_Get function 606 call from the power manager 210 requests the current power state of an identified component device. A Power_Wake function 608 call is a request for the device be enabled to wake itself or the system. In response, a device enables/disables wake support. Finally, a Power_Sequence function 610 call requests information from the device driver to enable optimizing power restoration to its associated device.

Figure 8:
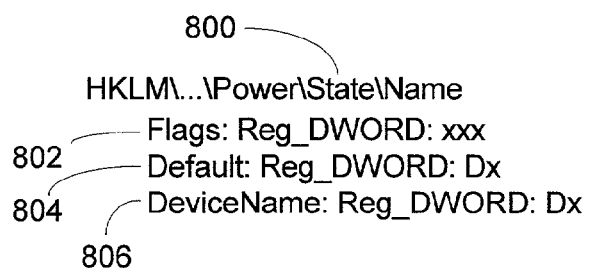
FIG. 8 is an exemplary list of defined global states for a named power state presented in WINDOWS registry entry format.

At any given time, the computing device containing the power manager 210 exists in a global power state defined from one of the global states stored within the registry 212. Referring now to FIG. 8, an exemplary registry entry format for storing a defined global state is illustratively depicted. In general, a computing device manufacturer specifies the global state definitions. The manufacturer explicitly defines global power state names as registry keys in the system configuration. The control panel power management interface 214 enables users/application providers to define new global power states and customize pre-defined global power states (e.g., specifying a non-default device power state for a previously defined global power state). The global power state name-to-device state mappings are enumerated as values under a global power state name key in the registry. The name, at the end of a designated registry path 800, is a key that specifies the name assigned to the defined device power states. The name is provided by to the power manager when an application or system entity seeks to initiate a transition to the designated global power state defined in the registry under the name key. A flags field 802 comprises system flags pertaining to the global power state 'Name'. The flags define whether the named state pertains to AC, DC (or both), behavioral settings, etc. A default field 804 specifies a default device power level setting for all devices while at the named global power state. If there is no defined default then Power Manager applies a full power state (D0). The REG_DWORD:Dx value in the Default field identifies a device power state (D0–D4) at which devices shall run while at the named system power state. Some devices are assigned a power level differing from the device power level specified by the default field. Such non-default device power levels are specified in a device name field 806. The device name field 806 explicitly identifies devices and a custom power level to be applied to the device (e.g., COM1: D3).

Figure 9:
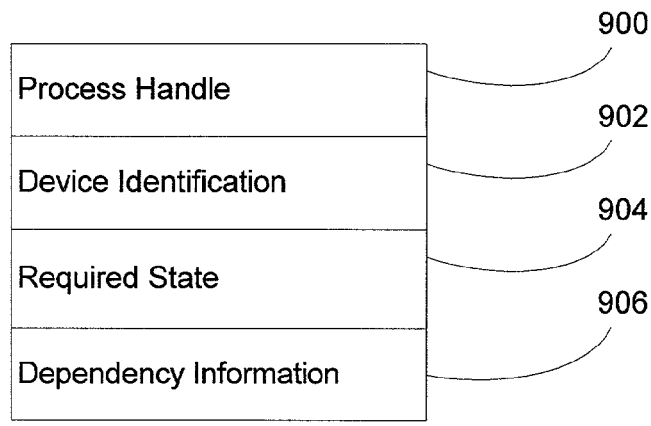
FIG. 9 is an exemplary structure maintained by the power manager for storing applications' requested component device power state requirements.

FIG. 9 is an exemplary structure maintained by the power manager for storing for applications' requested component device power state requirements. As mentioned hereinabove, the structure for maintaining the power states is embodied in a variety of forms in accordance with various alternative embodiments of the invention. However, in an embodiment of the invention, the requirements are stored in an heap structure that arranges the set of requirements as a set of nodes from highest required power state to lowest required power state. Each node identifies a process (by handle 900) that submitted the requirement, a device identification 902, and a required state 904 for the identified device. The node structure also contains a field supporting identification of parent/child power management dependency information 906.

Figure 10:
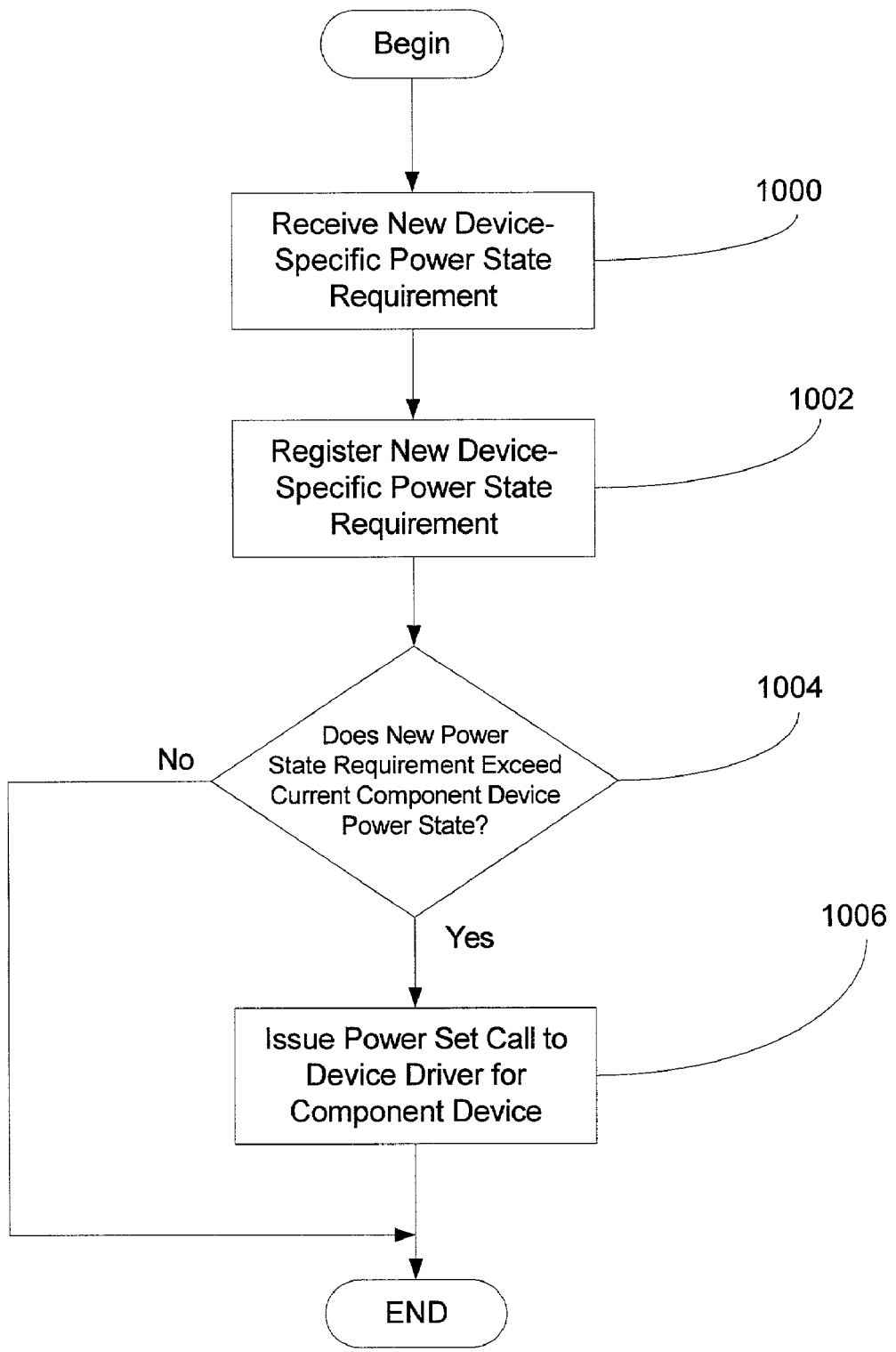
FIG. 10 is a flow diagram summarizing steps for processing a power state requirement for a device.

Turning to FIG. 10 a flow diagram summarizes steps for processing a power state requirement for a device that is submitted to the power manager 210. When applications require a particular device to maintain at least a certain power state, they submit a request to the power manager 210 in the form of a SetPowerRequirement function 314 call. After receiving the new device power state requirement during step 1000, control passes to step 1002 wherein the power manager 210 registers the power requirement. The power manager maintains only a single requirement for each application/device combination. Therefore, if an application previously submitted a power state requirement, then the power manager 210 replaces the previously registered power requirement by the new device power requirement.

The power manager 210, in addition to setting a new power state requirement entry based upon the application request, determines whether the requested device power state requires setting the device to a new level. Thus, at step 1004 if the new power state requirement level exceeds the device's current power state, then control passes to step 1006. At step 1006 the power manager 210 sets a new power state for the device based upon the new requirement. Control then passes to the End. If however, the new required power state does not exceed the device's current power state, then control passes from step 1004 to the End without modifying the current device power state. However, if a request is made to lower the device power state subsequent to registering the requirement, then the requirement will prevent the device power state from dropping below a specified power state floor.

Figure 11:
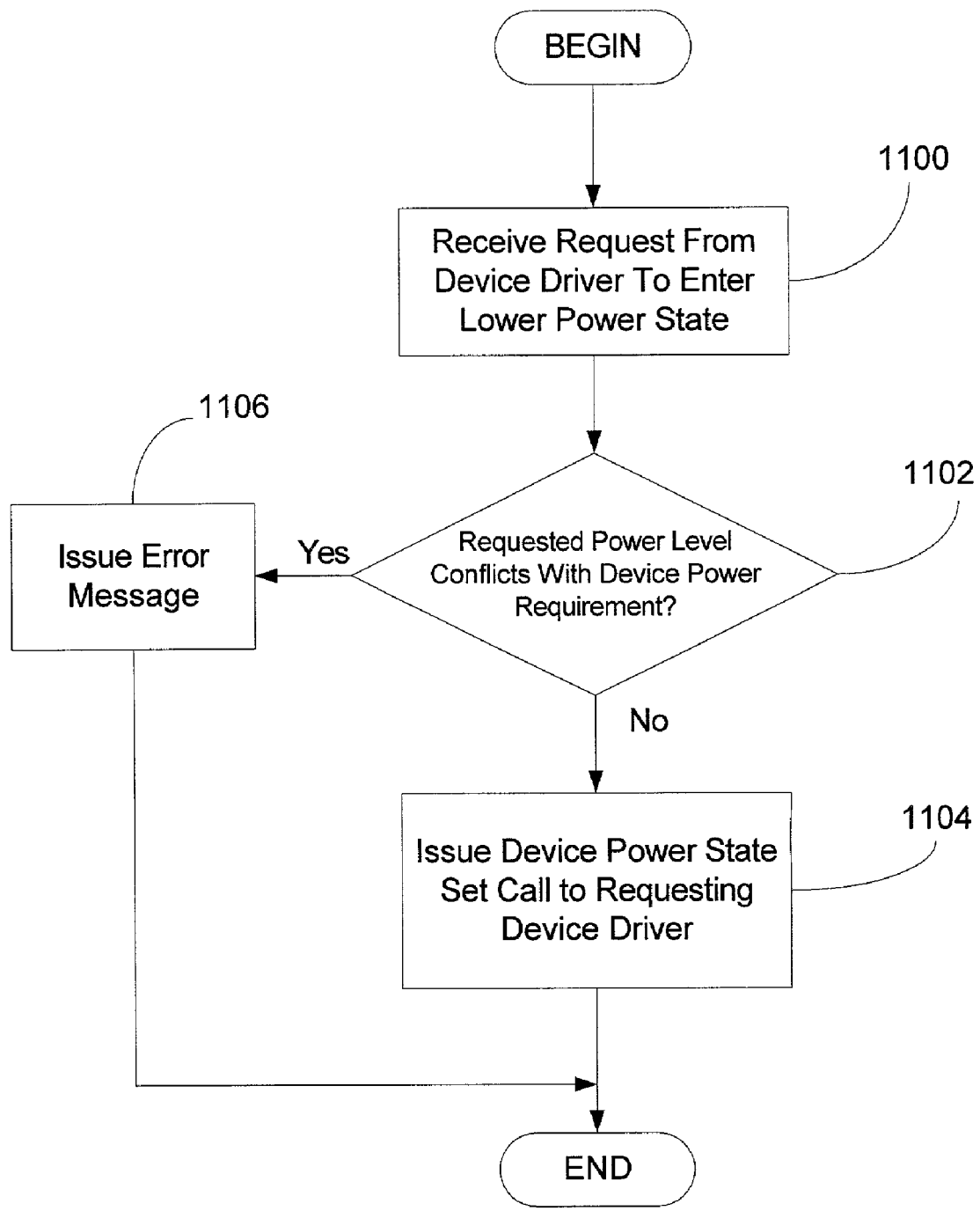
FIG. 11 is a flow diagram summarizing steps for processing a request to set a power state received from a device driver for its associated device.

Turning to FIG. 11 a flow diagram summarizes steps for processing a request from a device driver to set a power state for its associated device. In general, a device driver knows better than any other entity in the system what its recent usage pattern has been and whether a lower/higher power level might be appropriate. Thus, in an embodiment of the invention, a device driver is capable of over-riding a current device power state—such as for example a default setting for the device at the current global power state.

A device driver, by means of the DevicePowerNotify function 500 call, notifies the power manager 210 that it wants to change its device power state to a particular level. At step 1100 the power manager 210 receives the DevicePowerNotify function 500 call. Thereafter, at step 1102, the device manager examines the device power state requirements structure 226 to determine whether the received request from the device driver conflicts with a current device power requirement. If no entity has requested a power state requirement for the device that exceeds the device driver's requested power level, then control passes to step 1104. At step 1104 the power manager 210 issues a Power_Set function 604 call to the requesting device driver to set its device to the requested device power state/level. This new device state will remain in effect until a new Power_Set function 604 call to the device driver over-rides the new device power level. Such instances arise, for example, when a new global power level is entered or an application submits a SetPowerRequirement function 314 call to the power manager 210 specifying a power level that exceeds the device's current level. Control then passes to the End.

Otherwise, if there was a conflict with a current power state requirement for the device due to a previously registered SetPowerRequirement function 314 call, then control passes from step 1102 to step 1106 wherein the power manager 210 returns an error message without issuing the aforementioned Power_Set function 604 call. Control then passes to the End. It is further noted that if the request format itself is flawed, then the power manager 210 returns an ERROR_INVALID_PARAMETER response message to the requesting driver.

Figure 12:
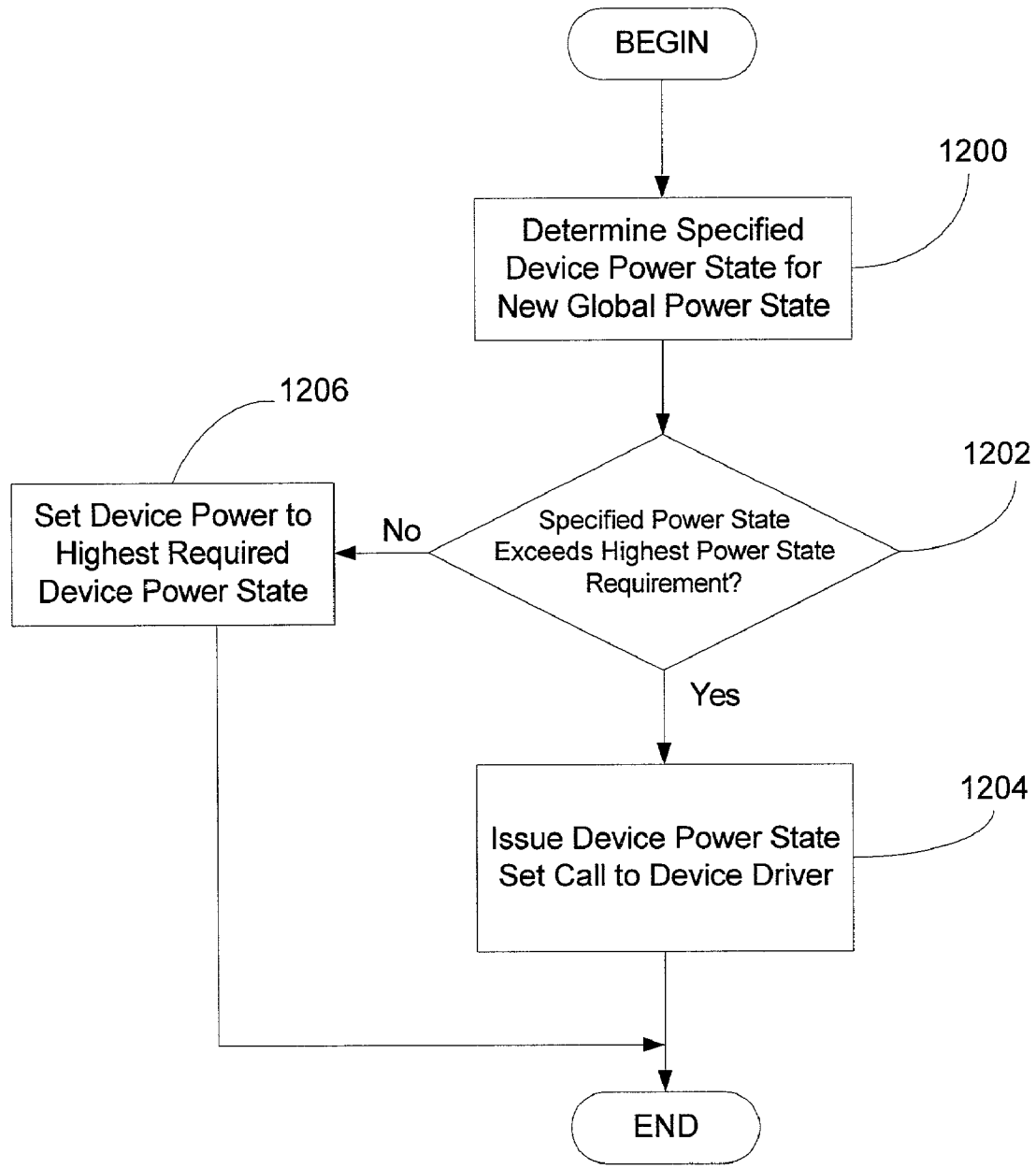
FIG. 12 is a flow diagram summarizing steps for setting a device power state in response to a global power state change.

Turning to FIG. 12 a flow diagram summarizes steps for setting a device power state in response to a global power state change. This procedure is followed for each of the devices registered for control by the power manager 210. In response to receiving a request to enter a new global state, at step 1200 the power manager 210 accesses the global power states in the registry 212 to determine the device's power state at the specified global power state. Next, at step 1202 the power manager 210 accesses the device power state requirements structure 226 to determine whether the specified device power level at the new global power state exceeds the required power state for the device.

If the specified new device power level exceeds the required power state, then control passes from step 1202 to step 1204. At step 1204, the power manager 210 issues a Power_Set function 604 call to the device driver to set its device to the new device power state/level. This new device state remains in effect until a subsequent Power_Set function 604 call to the device driver over-rides the new device power level. Such instances arise, for example, when: a new global power level is entered, the device itself requests permission to enter a new power state, or an application submits a SetPowerRequirement function 314 call to the power manager 210 specifying a power level that exceeds the device's current level. After setting the new device power state, control then passes from step 1204 to the End.

If however, the specified device power level specified under the new global power state does not exceed the required power state, then control passes from step 1202 to step 1206. At step 1206 the power manager 210 ensures that the device is using the minimum required power (since a prior global power state may have specified an even higher power state for the device). Thus, at step 1206 the power manager 210 issues a Power_Set function 604 call that specifies the highest required power state for the device. Control then passes to the End.

It will be appreciated by those skilled in the art that a new and useful method and system has been described for managing power levels of component devices within a computing device including a power manager. In view of the many possible environments to which the principles of this invention may be applied and the flexibility of designing and carrying out software utilities and tools, it should be recognized that the embodiments described herein are meant to be illustrative and should not be taken as limiting the scope of invention. Those skilled in the art to which the present invention applies will appreciate that the illustrated embodiments can be modified in arrangement and detail without departing from the spirit of the invention. Therefore, the invention as described herein contemplates all such embodiments as may come within the scope of the following claims and equivalents thereof.

What is claimed is:

1. A power management framework, embedded as computer instructions and data structures in a computer storage medium, for managing consumption of power by a computing device comprising a plurality of component devices managed by device drivers, the power management framework comprising:
   a set of global power state definitions, wherein each global power state definition specifies a default power state for each of the plurality of component devices managed by device drivers; and
   a power manager including:
      an application interface including a function facilitating registering a required power state for a specified one of the plurality of component devices managed by the device drivers, wherein the required power state comprises a power state floor for the specified component device,
      a device driver interface including a device power state set function facilitating issuing a device-specific command setting a power state of the specified component device to the power state floor, and
      logic for detecting that a new global power state is pending wherein a new power state for the specified component device is less than the power state floor of the specified one of the plurality of component devices, and in response, maintaining the power state floor of the specified component device while entering the new global power state.

2. The power management framework of claim 1 wherein the device driver interface includes a function for facilitating receiving a request from a device driver for a specified device to transition from a current device power state to a second new device power state, and in response invoking the device power state set function to transition the specified device to the second new device power state.

3. The power management framework of claim 2 wherein in response to receiving the request from the device driver to transition the specified component device to the second new device power state, the logic determines whether the request to transition conflicts with a registered power requirement from an application for the specified component device.

4. The power management framework of claim 1 wherein the power manager further comprises a notification interface for notifying applications of power state events.

5. The power management framework of claim 1 wherein the power manager comprises an application requirements storage structure for maintaining device-specific power state requirements.

6. The power management framework of claim 5 wherein the application interface includes a function for releasing a previously submitted power state requirement for a device registered within the application requirements storage.

7. The power management framework of claim 1 wherein the device interface further includes a function for obtaining a set of power state support capabilities from device drivers for their associated component devices.

8. The power management framework of claim 1 wherein the application interface includes a function for enabling applications to request a transition to a specified one of a set of global power state definitions.

9. The power management framework of claim 8 wherein the decision logic includes device-specific power requirement logic that applies device power state requirements registered for each component device to device power states designated in the specified global power state definition.

10. The power management framework of claim 1 further comprising a control panel interface facilitating submitting, via a user interface, modifications to the global power state definitions.

11. A method for implementing application power requirements-derived device power state schemes, on a computing device comprising a plurality of component devices managed by device drivers, a set of global power state definitions, wherein each global power state definition specifies a default power state for each of the plurality of component devices managed by device drivers, and a device driver interface including a device power state set function for issuing a device-specific command for setting a power state of the specified component device to a specified power state, the method comprising the steps of:
  establishing a set of device-specific power states under a selected one of the set of global power state definitions;
  registering, via an application interface, a required power state for a specified one of the plurality of component devices managed by the device drivers, wherein the required power state comprises a power state floor for the specified component device;
  detecting entry of a new global power state, wherein a corresponding new power state for the specified component device is less than the power state floor of the specified one of the plurality of component devices; and
  maintaining the power state floor of the specified component device while in the new global state.

12. The method of claim 11 further comprising the steps of:
  receiving a request from a device driver for a specified device to transition from a current device power state to a second new device power state, and in response invoking the device power state set function to transition the specified device to the second new device power state.

13. The method of claim 12 wherein in response to receiving the request from the device driver to transition the specified component device to the second new device power state, determining whether the request to transition conflicts with a registered power requirement from an application for the specified component device.

14. The method of claim 11 further comprising notifying applications of power state events.

15. The method of claim 11 wherein a power manager comprises an application requirements storage structure for maintaining device-specific power state requirements, and further comprising the step of releasing a previously submitted power state requirement for a device registered within the application requirements storage.

16. The method of claim 11 further comprising the step of obtaining a set of power state support capabilities from device drivers for their associated component devices.

17. The method of claim 11 further comprising the step of receiving, from an application, a request to transition to a specified one of the set of global power state definitions.

18. The method of claim 17 further comprising the step of applying device power state requirements registered for each component device to device power states designated in the specified global power state definition.

19. The method of claim 11 further comprising the step of receiving, via a user interface, modifications to the global power state definitions.

20. A computing device for implementing application power requirements-derived device power state schemes, the computing device comprising:
  a plurality of component devices managed by device drivers; and
  a power manager comprising:
    a set of global power state definitions, wherein each global power state definition specifies a default power state for each of the plurality of component devices managed by device drivers, the global power state definitions established by an original equipment manufacturer;
    a device driver interface including a device power state set function facilitating issuing a device-specific command setting a power state of the specified component device to a specified power state;
    a global power states register for establishing a set of device-specific power states under a selected one of the set of global power state definitions;
    a power states requirement interface for registering, via an application interface, a required power state for a specified one of the plurality of component devices managed by the device drivers, the required power state comprising a power state floor for the specified component device; and
    a power states arbiter for detecting that the power state requirement is less than the power state floor, and in response, maintaining the power state floor of the specified component device while entering a new global state.

21. The computing device of claim 20 wherein the power manager further comprises:
  a driver interface for receiving a request from a device driver for a specified device to transition from a current device power state to a new device power state, and in response invoking the device power state set function to transition the specified device the new device power state.

22. The computing device of claim 21 wherein the power states arbiter further includes a conflict detector that, in response to receiving the request from the device driver to transition the specified component device to the new device power state, determines whether the request to transition conflicts with a registered power requirement from an application for the specified component device.

23. The computing device of claim 20 wherein the power manager further comprises means for notifying applications of power state events.

24. The computing device of claim 20 wherein the power manager includes an application requirements storage structure for maintaining device-specific power state requirements, and further comprises a command for releasing a previously submitted power state requirement for a device registered within the application requirements storage.

25. The computing device of claim 20 wherein the power manager includes means for obtaining a set of power state support capabilities from device drivers for their associated component devices.

26. The computing device of claim 20 wherein the power manager further comprises an application interface for receiving, from an application, a request to transition to a specified one of the set of global power state definitions.

27. The computing device of claim 26 wherein the power manager further comprises power-state decision logic for applying device power state requirements registered for each component device to device power states designated in the specified global power state definition.

28. The computing device of claim 20 wherein the power manager further comprises a user interface for receiving modifications to the global power state definitions.

* * * * *